Patented July 10, 1951

2,560,029

UNITED STATES PATENT OFFICE 2,560,029

BUTADIENE-STYRENE RUBBERY COPOLYMER STABILIZED WITH ANTIMONYL-4,6 DIMETHYL CATECHOLATE

Harry E. Albert and George E. P. Smith, Jr., Akron, Ohio, assignors to The Firestone Tire & Rubber Company, Akron, Ohio, a corporation of Ohio No Drawing. Application November 21, 1950, Serial No. 196,934. In Canada October 28, 1949

2 Claims. (Cl. 260—45.75)

This invention relates to the stabilization of the rubber-like polymerizate of 1,3-butadiene and styrene with antimonyl-4,6-dimethyl catecholate. The application is a division of Albert and Smith application Serial No. 84,493 filed March 30, 1949.

The invention includes the stabilization of the uncured copolymer, the stabilization of the cured copolymer and the process of stabilization. A particular application of the invention is in the stabilization of compounds of the rubber-like copolymer which are white or pastel shades—for example, the white sidewalls of tires, etc.—because the stabilizers of this invention do not discolor. Difficulty has been experienced in finding a satisfactory non-discoloring stabilizer for GR-S. Penyl-beta-naphthylamine, which is the most widely used stabilizer for GR-S, discolors badly.

The antioxidant or stabilizing effect of antimonyl-4,6-dimethyl catecholate was compared with that of a commercial stabilizer identified as Stabilizer A. The samples were obtained from different batches of GR-S latex each containing 2 per cent of stabilizer. The latex was coagulated with low-iron aluminum sulfate.

TABLE I
*Copolymer aging*

| Stabilizer | After Drying 20 Hours at 75° C. | After Heat-aging at 110° C. | | |
|---|---|---|---|---|
| | | One Day | Two Days | Four Days |
| antimonyl-4,6-dimethylcateholate | No deterioration | Unchanged | Unchanged | Unchanged. |
| Stabilizer A (control) | do | do | do | Somewhat set up. |

The data for the above table were obtained by a manual test of the various samples. These data show that the antimonyl compound is superior to Stabilizer A as an antioxidant for the copolymer.

Two per cent of antimonyl-4,6-dimethyl catecholate and 2 per cent of Stabilizer A were added to GR-S latices which were then coagulated with low-iron aluminum sulfate and each coagulum was then compounded according to the following formula. Various tests were run on these two stocks.

FORMULA

| | Parts by weight |
|---|---|
| Copolymer containing 2% stabilizer | 100.00 |
| Coumarone resin | 10.00 |
| Accelerator | 1.10 |
| Wax | 2.00 |
| Magnesium oxide | 8.00 |
| Zinc oxide | 100.00 |
| Ultramarine blue | 0.10 |
| Titanium dioxide | 30.00 |
| Sulfur | 4.00 |

The stocks were cured 50 minutes at 300° F. The vulcanizates were tested in a fadeometer and under a General Electric sunlamp at a distance of seven inches.

TABLE II
*Artificial exposure tests*

| Stabilizer | Fadeometer at 125° C. | | Sunlamp | |
|---|---|---|---|---|
| | 5 Hours | 10 Hours | 8 Hours | 16 Hours |
| Antimonyl-4,6-dimethyl catecholate. | Slightly discolored | Cream | Very slightly discolored | Light tan. |
| Stabilizer A (control) | Tan | Light brown | Light tan | Dark tan. |

Natural exposure tests were conducted on tapered dumb-bell strips of stock cured 50 minutes at 300° F. and stretched 12½ per cent. The tests were conducted in Akron, Ohio, starting in May.

TABLE III
*Natural exposure tests*

| Stabilizer | 1 Month | 2 Months |
|---|---|---|
| Antimonyl-4,6-dimethyl catecholate | White | White. |
| Stabilizer A (control) | Light tan | Tan. |

These tests show that antimonyl-4,6-dimethyl catecholate stabilizes the uncured copolymer and preserves it during drying.

The antimonyl-4,6-dimethyl catecholate was made as follows: 2-bromo-4,6-dimethylphenol (Department of Comerce, U. S. Bureau of Mines, Report R. I. 2968, January 1930, page 13) was converted to 4,6-dimethyl catechol by refluxing, with stirring, the following ingredients at 107° C. for nine hours:

6.5 moles NaOH
1.0 moles $BaCl_2.2H_2O$
0.75 moles 2-bromo-4,6-dimethylphenol
22 g. $Cu_2Cl_2$
1000 c. c. $H_2O$ The reaction product was acidified with hydrochloric acid, extracted with ether, the ether evaporated and the residue was vacuum distilled at 4 mm. The major portion of the product distilled at 118.5–119° C. as a red liquid. The product was then recrystallized from petroleum ether-benzene to yield the pure 4,6-dimethyl catechol, melting at 64–66° C.

The antimony salt of the catechol so produced was prepared by heating 16 grams of the 4,6-dimethyl catechol with 8 grams of water on a steam plate and adding to the mixture 17.8 grams of $Sb_2O_3$. After one hour the reaction mass had solidified. The mixture was heated for another 1.5 hours to complete the reaction. The product was obtained as 29.5 grams of a solid, which was ground to a gray-white powder for use in the stabilizing tests disclosed above.

What we claim is:

1. Rubber-like copolymer of 1,3-butadiene and styrene stabilized with a small amount of antimonyl-4,6-dimethyl catecholate.

2. The process of drying rubber-like copolymer of 1,3-butadiene and styrene which comprises heating the same admixed with antimonyl-4,6-dimethyl catecholate as a stabilizer.

HARRY E. ALBERT.
GEORGE E. P. SMITH, JR.

REFERENCES CITED

The following references are of record in the file of this patent:

UNITED STATES PATENTS

| Number | Name | Date |
|---|---|---|
| 2,488,975 | Hunter | Nov. 22, 1949 |